United States Patent [19]

Fürsich et al.

[11] Patent Number: 4,561,768
[45] Date of Patent: Dec. 31, 1985

[54] COLOR COPYING METHOD

[75] Inventors: Manfred Fürsich, Taufkirchen; Helmut Treiber, Munich, both of Fed. Rep. of Germany

[73] Assignee: Agfa Gevaert Aktiengesellschaft, Leverkusen, Fed. Rep. of Germany

[21] Appl. No.: 610,399

[22] Filed: May 15, 1984

[30] Foreign Application Priority Data

May 17, 1983 [DE] Fed. Rep. of Germany ....... 3317818

[51] Int. Cl.$^4$ ............................................. G03B 27/78
[52] U.S. Cl. ....................................... 355/38; 355/68; 355/77
[58] Field of Search ....................... 355/38, 77, 68, 67; 356/404, 443, 405, 406

[56] References Cited

U.S. PATENT DOCUMENTS 3,527,540 9/1970 Bowker et al. ...................... 356/404
4,101,217 7/1978 Fergg et al. ............................ 355/38
4,279,502 7/1981 Thurm et al. .......................... 355/38

Primary Examiner—L. T. Hix
Assistant Examiner—Della Rutledge
Attorney, Agent, or Firm—Peter K. Kontler

[57] ABSTRACT

An exposed and developed strip of film has a series of frames which are to be copied. The strip is scanned at a multiplicity of regions to measure the transparencies in the three primary colors, and the most transparent region of the film strip is established. The neutral density of each region of a frame is calculated as are the density differences between the respective region and the most transparent region in the three primary colors. The color density differences for each region are plotted on a color density diagram having six equally spaced axes which radiate from a common origin. The origin is defined by the color densities of the most transparent region while the respective axes represent the three primary colors and the three complementary colors. The color density diagram is divided into four color segments. The density differences for each region are vectorially added in the color density diagram to generate a resultant vector. The length of the resultant vector is compared with a reference value which is a function of the color segment into which the vector projects and is also a function of the difference in neutral density between the region under investigation and the most transparent region. If the length of the resultant vector is greater than the reference value, a color dominant is assumed to be present.

31 Claims, 4 Drawing Figures

COLOR COPYING METHOD

BACKGROUND OF THE INVENTION

The invention relates generally to a method of copying colored originals such as, for example, the frames of exposed and developed strips of color film.

More particularly, the invention relates to a method of determining the amount of light in each primary color to which a colored original is to be exposed during copying.

In a known method of determining the amount of light in each primary color to which a colored original is to be exposed during copying, each of a series of regions or points of the original is scanned in the three primary colors, e.g. to measure the transparency of the original to light of each color. The measurements obtained from each region are compared with reference values in order to determine whether the respective regions contain color dominants. The amount of light in each primary color to which the original is to be exposed during copying is then calculated disregarding the regions with color dominants altogether or giving less weight to such regions.

The so-called neutral gray compensation principle employed in color copying is capable of compensating for color tones which are inherent in the film or paper constituting the original or negative. However, the use of the neutral gray compensation principle for automatic exposure control leads to difficulties when the motif of the original or negative contains intensively colored areas, that is, so-called color dominants. If the neutral gray compensation principle is uniformly applied to such an original, a color shift occurs in the copies rendering the copies unusable. This gives rise to the problem of distinguishing between color tones and color dominants and applying the so-called neutral gray correction to color tones only.

Neutral gray correction is performed by selecting the amount of copying light in each primary color so that the copy has a neutral gray color composition on average. This may be accomplished using a photoelectric measuring device. The correct amount of light in each primary color may be obtained by regulating the exposure time in the respective color or by regulating the intensity of the light in the respective color.

The West German Auslegeschrift No. 25 35 034 discloses a photographic color copier having a photoelectrically regulated exposure control unit. Various regions of an original are scanned in each primary color and ratios of the measured values for different colors are formed for each region. When a clear color imbalance exists for a particular region, special measures are employed for the respective region, e.g. assigning only partial weight to such region in calculating a gray value or constant value for neutral gray correction. These measures are intended to reduce or eliminate the effects of dominants during determination of the amounts of copying light required for neutral gray compensation.

In the copier of the West German Auslegeschrift, the densities of the individual colors in each region are compared in order to determine whether one of the three primary colors predominates relative to the others. Ratios of blue density/green density, green density/red density and/or red density/blue density are formed and compared with reference values. Since the densities of the masks used in the production of film vary from one manufacturer to another, the reference values for different types of film must be different if reliable results are to be obtained. In determining the amounts of copying light required for an original, it is therefore necessary to provide data relating to the manufacturer of the film. This information can only be fed into the copier manually, particularly when a copy of an original is back ordered and the original constitutes a frame of one of a series of so-called multiple frame strips, that is, strips which respectively contain four or five originals. Manual input of information relating to the manufacturer increases labor costs. In another known method of determining the amount of copying light in each primary color, a so-called reference density in each primary color is employed as a comparison to determine whether inequalities in the densities of the individual colors indicate the presence of a color dominant. The reference densities for a specific type of film are derived from the results of measurements made on a large number of originals produced by the same manufacturer. Here, also, it is necessary to provide information on the type of film constituting an original to be copied in order to perform a copying operation. Furthermore, this method involves the expense of determining reference densities in the three primary colors from a large number of originals for each type of film to be copied.

An additional drawback of the methods outlined above stems from the fact that the film type indicated at the edge of a film identifies the photometric properties of the film under proper processing conditions. However, deviations from the normal processing parameters for a film may occur if, for instance, the film is stored for too long a period or at too high a temperature or a latent image on the film undergoes changes because of excessive storage time, particularly at elevated temperatures. Departures from the expected photometric properties of the film always result in color shifts.

OBJECTS AND SUMMARY OF THE INVENTION

It is an object of the invention to provide an improved method of recognizing color dominants originating in the motif of an original.

Another object of the invention is to provide a method of identifying color dominants which eliminates the need for supplying data on the type of material constituting an original to be copied.

The preceding objects, as well as others which will become apparent as the description proceeds, are achieved by the invention.

One aspect of the invention resides in a method of determining the amount of light in each primary color for copying a colored original. The method comprises the following steps:

(a) Measuring a property, e.g. the transparency, of a photosensitive article containing at least one colored original in each of the primary colors. The measuring step is performed at a multiplicity of regions located in a portion of the article which includes the original.

(b) Analyzing the measurements obtained during the measuring step to identify at least one region having a transparency which equals or exceeds the transparencies of the remaining regions.

(c) Evaluating selected regions constituting part of the original to detect color dominants. The evaluating step for each selected region includes processing the respective measurements to derive a characteristic value representing at least one color characteristic of the selected region relative to the corresponding color characteristic of the aforesaid region of maximum transparency. The evaluating step for each selected region further includes comparing the respective characteristic value with a reference value to thereby establish the probable presence or absence of a color dominant in the selected region.

(d) Calculating the amount of light in each primary color for copying the original. The calculating step is based on the measurements obtained from the selected regions and is performed giving less weight to the selected regions which probably contain a color dominant than to the selected regions which are probably substantially free of color dominants.

The method of the invention is particularly well-suited for copying frames constituting part of an exposed and developed strip of color film.

According to one embodiment of the invention, the regions which probably contain a color dominant are disregarded in calculating the amounts of copying light in the primary colors.

The invention is based on the recognition that the most transparent region or point of a negative and its surroundings, or of an entire film strip, receive little light during exposure of the film and thus has a density which is nearly the same as that of the mask used during production of the film. The invention further takes into consideration the fact that the density differences between the individual colors cannot be large in those regions having a very low overall density. Thus, inasmuch as this is the case, it follows that the individual color densities of the most transparent region are very similar to those of the mask. The differences between the individual color densities of the mask-like, most transparent region and the corresponding color densities of any other region will accordingly always provide a very good indication of the color characteristics of the latter region. A comparison of the normalized color densities obtained in this manner with predetermined reference values surprisingly provides a reliable determination of the presence or absence of color dominants originating in the motif of an original. Any color tones generated by the mask, by excessive storage or by temperature effects are transferred to the most transparent region in the same manner as to any other region thereby enabling color dominants to be reliably distinguished from color tones.

According to one embodiment of the invention, the most transparent region is selected on the basis of its neutral density which is calculated as the arithmetic average of the densities of the three primary colors. Certain density criteria are employed here in order to distinguish the most transparent region from holes and other discontinuities in the material constituting the original. This embodiment of the invention enables dominants to be detected with an increased degree of reliability.

The degree of reliability of dominant detection may be further increased by selecting the reference values so that these increase with increasing neutral density of the region under investigation for the presence of dominants. This embodiment of the invention is based on the fact that a relatively small difference between the densities of the individual colors is sufficient to indicate the presence of a color dominant in a region having a very low neutral density. In regions having high neutral densities, the presence of a dominant results in much larger differences between the individual color densities. This variation of the differences in the individual color densities with increasing neutral density is taken into account by selecting the reference values so as to increase with increasing neutral density of the region being investigated.

In accordance with another embodiment of the invention, the reference value for a region under investigation depends upon the predominant color of the region. This takes into consideration the fact that dominants in different colors affect the overall exposure of an original differently.

The novel features which are considered as characteristic of the invention are set forth in particular in the appended claims. The improved color copying method itself, however, together with additional features and advantages thereof, will be best understood upon perusal of the following detailed description of certain specific embodiments with reference to the accompanying drawings.

DESCRIPTION OF THE PREFERRED EMBODIMENTS

Figure 1:
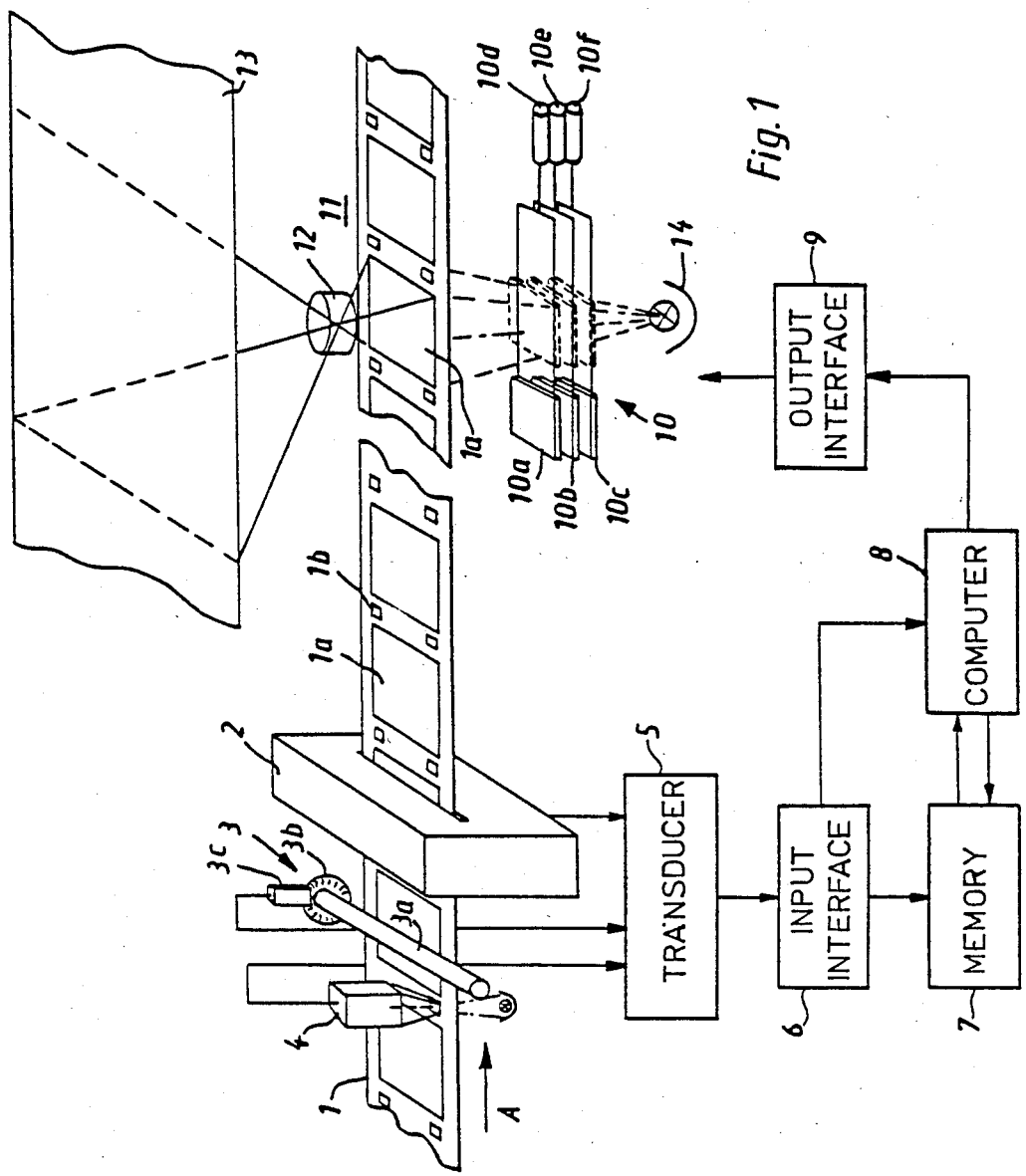
FIG. 1 illustrates a copier for performing the method of the invention.
Figure 2:
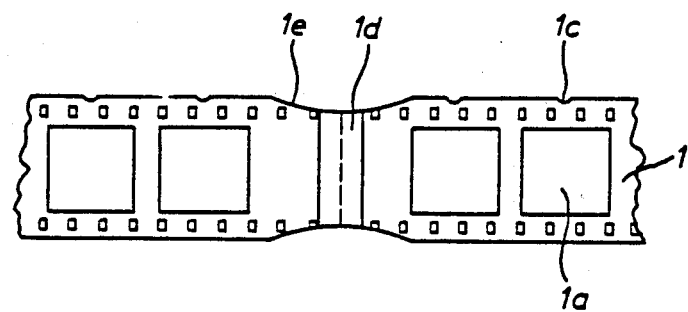
FIG. 2 shows a junction between two strips of exposed and developed film each of which contains a series of frames to be copied in the copier of FIG. 1.

Referring to FIG. 1, the reference numeral 1 identifies a length of photosensitive material or film having a series of originals or negatives 1a. The film 1 further has a series of detectable marks 1b which are correlated with and identify the positions of the negatives 1a. The marks 1b may, for example, be apertures which are aligned with the negatives 1a as is the case for 126 and 110 size film. As shown in FIG. 2, the marks may also be form of notches 1c which are disposed at the edges of the film 1. For 135 size film, such notches 1c are formed at the edges in correlation with the negatives 1a after the film has been exposed and developed. The film 1 is here assumed to be an exposed and developed film.

The direction of travel of the film 1 is indicated by the arrow A. A sensing device 4, e.g. in the form of a light barrier, is located along the path A of the film 1 and detects the marks 1b as they pass by. The sensing device 4 emits a signal upon detection of a mark 1b and such signal is forwarded to a transducer 5.

A length detector 3 is disposed adjacent to the path A of the film 1 downstream of the sensing device 4. The length detector 3 includes a roller 3a which is caused to rotate by the film 1. A disc 3b is mounted on the roller 3a and is provided with a series of uniformly spaced, radial slits near its periphery. The disc 3b is arranged to rotate through a light barrier 3c which generates pulses in response to detection of the slits. The pulses are indicative of the length of film traveling by the length detector 3. The light barrier 3c is connected with the transducer 5 so that the latter receives the signals generated by the light barrier 3c.

Downstream of the length detector 3 as considered in the direction of travel A of the film 1 is a transparency or light measuring system 2. The transparency measuring system 2 has three rows of photoreceivers, e.g. phototransistors or photodiodes, which extend across the width of the film 1. Each row may contain ten photoreceivers which respectively scan one-tenth of the width of the film 1. Each photoreceiver is sensitized for one of the primary colors and the photoreceivers are arranged in such a manner that any region or point of the film 1 subjected to a measurement is scanned in each of the three primary colors. The photoreceivers are designed to emit signals representative of the transparency of the film 1 in the respective colors. In order to ensure that each point or region of the film 1 which is subjected to a measurement is scanned in each of the three primary colors, the three rows of photoreceivers may be located closely behind one another as considered in the direction of travel A of the film 1. It is also possible for the three rows of photoreceivers to be remote from one another and to direct the light which has passed through a region of the film 1 to be measured to the respective rows of photoreceivers via filters and/or partially light-transmissive reflectors.

The transparency measuring system 2 is connected with the transducer 5 so that the three transparency signals, i.e. one signal per color, for each measured region of the film 1 are delivered to the transducer 5. The transducer 5 converts the transparency signals into density values. The length detector 3 coordinates the movement of the film 1 and the operation of the measuring system 2 in such a manner that an original 1a of specific size is scanned in its entirety by the performance of a specific number of measuring procedures. For instance, the length detector 3 may coordinate movement of the film 1 and operation of the measuring system 2 so that an original 1a of small size is entirely scanned by the performance of 14 measuring procedures. During each measuring procedure, 30 signals are generated by the measuring system 2, namely, ten in each color. The sensing device 4 functions to correlate the measurements made by the measuring system 2 with the originals 1a on which the measurements were performed.

An input interface 6 is connected with and arranged to receive the density values calculated by the transducer 5. The input interface 6 transmits these density values to a computer 8 as well as a memory 7. The computer 8 and memory 7 are connected with one another. The computer 8 retrieves from the memory 7 those data required for the individual steps of the calculation to be described below. By way of example, the computer 8 may be a microprocessor marketed by Digital Equipment Corp. under the designation LSI 11/23.

An output interface 9 is connected with the computer 8. The output interface 9 delivers control pulses to a filter system 10 constituting part of a copying station 11. The copying station 11 is located a certain distance downstream of the measuring system 2. In addition to the filter system 10, the copying station 11 contains a light source 14 and an objective lens 12. The objective lens 12 focuses the image of an original 1a located in the copying station 11 onto a strip 13 of the color copying material.

The filter system 10, which is located between the light source 14 and the film 1, comprises three copying filters 10a, 10b, 10c as well as guides and drives for the filters 10a-10c. The drives are conventional and are here in the form of electromagnets 10d, 10e, 10f, which respectively move the filters 10a-10c. Each of the filters 10a-10c is designed to terminate exposure of an original 1a in one of the primary colors upon being moved into the path of the light from the light source 14 to the original 1a. illustrated filter system 10 containing the color filters 10a-10c and the corresponding electromagnets 10d-10f is designed to regulate the amounts of copying light in the different colors by controlling the exposure time in each color. However, the amounts of copying light in the various colors may also be regulated by controlling the intensity of the light. This may be accomplished by moving subtractive color filters into the path of the copying light to a greater or lesser extent so that the required color composition calculated by the computer 8 is achieved. The exposure time is here the same for all of the primary colors and is calculated by the computer 8. The exposure may be terminated using a shutter which is equipped with a drive similar to that employed for the filters 10a-10c.

Figure 4:
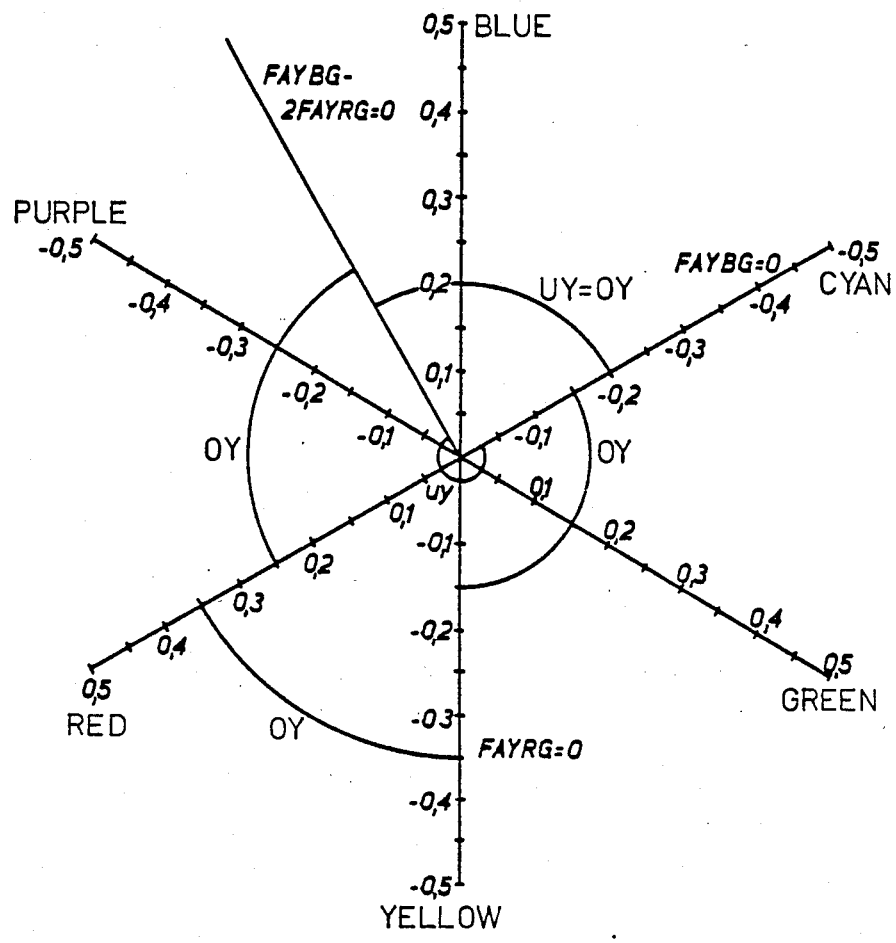
FIG. 4 shows a second color density diagram for increasing the reliability of dominant detection.

The film 1 of FIG. 1 appears to be of a single type having a predetermined length. In practice, however, a film such as the film 1 is always composed of several individual film strips which are adhesively joined to one another. This is illustrated in FIG. 2 which, as indicated previously, shows 135 size film, i.e. small image or small size film. The film 1 of FIG. 2 is seen to have an adhesive joint 1d which connects two different strips of film. Aside from the edge notches 1c which identify the locations of the originals 1a, the film 1 of FIG. 4 is provided with an arcuate cutout 1e at and on either side of the adhesive joint 1d. The cutouts 1e make it possible to mechanically detect the transition from one film strip to another. The cutouts 1e may be eliminated if an infrared detector rather than a mechanical detector is employed. Thus, as a rule, adhesive strips are opaque to infrared radiation.

Figure 3:
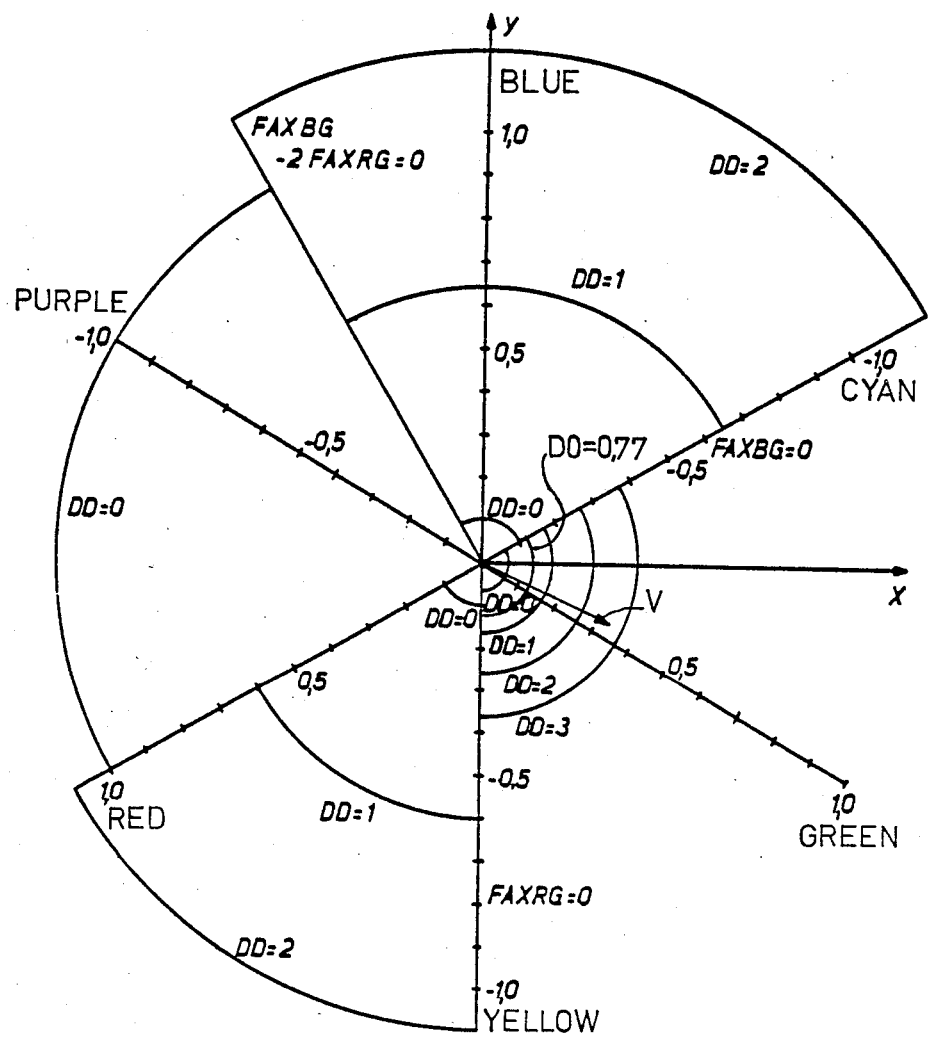
FIG. 3 illustrates a first color density diagram for use in detection of color dominants.

The evaluation of the transparency measurements obtained from the originals 1a occurs in accordance with FIGS. 3 and 4.

FIG. 3 illustrates an hexagonal color density diagram. The color density diagram of FIG. 3 has six equally spaced color axes which radiate from a common origin. The color axes include a blue axis which is coextensive with the positive Y-axis. Clockwise of the blue axis is a cyan axis marked with negative coordinates while clockwise of the cyan axis is a green axis marked with positive coordinates. The X-axis in FIG. 3 bisects the angle between the cyan and green axes. On the opposite side of the origin from the cyan axis is a red axis. The red axis constitutes an extension of the cyan axis and is marked with positive coordinates, that is, cyan corresponds to negative red. Similarly, a purple axis lies on the opposite side of the origin from and constitutes an extension of the green axis. The purple axis is marked with negative coordinates. Thus, purple corresponds to negative green. Finally, a yellow axis marked with negative coordinates is disposed on the opposite side of the origin from the blue axis and constitutes an extension of the latter. As before, yellow corresponds to negative blue.

The origin of the color density diagram of FIG. 3 is defined by the blue density BMIN, the green density GMIN and the red density RMIN of the most transparent region or point of the film strip or the section thereof being investigated.

The color density diagram of FIG. 3 is divided into four color segments or areas. These include a blue segment which is bounded by the cyan axis and a line bisecting the angle between the blue and purple axes. The color segments or areas further include a green segment which is bounded by the cyan and yellow axes as well as a yellow/red segment which is bounded by the yellow and red axes. The color density diagram of FIG. 3 finally has a purple segment which is bounded by the red axis and the line bisecting the angle between the blue and purple axes. One or more concentric arcs of different radii are drawn in each of the color segments. The significance of these arcs will be explained below during the description of the calculations involved in detecting the presence of a color dominant.

In operation of the copier of FIG. 1, the transparency measuring unit 2 is reset for the performance of a new set of measurements in response to entry of a junction 1d of the film 1 into the measuring unit 2. The entire film strip between this junction 1d and the succeeding junction 1d, or a representative portion of such film strip or, under unfavorable conditions, only a single original 1a is then scanned in the three primary colors. The transparency measurements obtained from the film strip under investigation are converted into density values in the transducer 5 and these density values are stored in the memory 7 in correlation to the locations of the film strip from which they were derived. The scanning operation is performed on the originals 1a as well as on those portions of the film strip outside of the borders of the originals 1a. Thus, the edges of the film strip as well as the strips between neighboring originals 1a are scanned in addition to the latter. The path of travel of the film 1 between the measuring unit 2 and the copying station 11 has a length which is sufficiently great that the leading original 1a of a film strip enters the copying station 11 only after all measurements required for calculation of the amounts of copying light in the three primary colors have been obtained and stored. If necessary, the length of the path of travel between the measuring unit 2 and the copying station 11 may be increased by means of a non-illustrated looped guide for the film 1. Once the junction 1d trailing the film strip which is being copied enters the copying station 11, the data in the memory 7 relating to this film strip are erased.

The measurements performed during the scanning operation yield the blue, green and red densities of each scanned region of the film strip. The neutral density of each region is calculated as the arithmetic average of the respective blue, green and red densities. The region of the film strip having the greatest transparency or the lowest density is determined on the basis of the neutral densities and is taken as the region having the lowest neutral density. Experience has shown that the neutral density of the most highly transparent region should be no greater than about 0.9. It is to be observed that regions of the film strip outside of the borders of the originals 1a may be considered in establishing the region of greatest transparency. In order to ensure that holes or tears in the film strip are not regarded as regions of maximum transparency, additional criteria are employed in establishing the region of greatest transparency. These criteria are that the blue density of the most highly transparent region should be greater than about 0.7 and that the difference between the blue density and the red density should be greater than about 0.15.

As indicated previously, the origin of the color density diagram of FIG. 3 is defined by the blue density BMIN, the green density GMIN and the red density RMIN of the most highly transparent region. Experience has shown that the density of the most highly transparent region deviates only slightly from the density of the mask used during production of the respective film strip. This is the reason why the following calculation for determining the presence of dominants does not require data relating to the type of material constituting the film strip. While regions of the film strip both inside and outside the borders of the originals 1a may be considered in establishing the region of greatest transparency, only regions of the originals 1a are employed in the calculations for determining the presence or absence of dominants.

In order to determine whether a region of an original 1a does or does not contain a dominant, the computer 8 withdraws the neutral density as well as the color densities, i.e. the blue, green and red densities, for this region from the memory 7 and performs the following operations:

For each color, the difference between the density of the region being investigated and the density of the most highly transparent region is calculated. The three density differences which result are plotted as vectors in the color density diagram of FIG. 3 where they are then added vectorially. The resultant color vector V of the region under investigation, which extends from the origin, has a certain length as well as a certain direction. As an example, FIG. 3 illustrates a resultant vector V which represents the following density differences for the respective colors: green=1.0; blue=0.7; and red=0.6. The resultant vector V is compared with a reference value which depends upon the color segment of the color density diagram into which the vector V extends and upon the difference DD between the neutral density PD of the region being investigated and the neutral density DMIN of the most highly transparent region. For the exemplary vector V of FIG. 3, the neutral density difference DD is obtained as follows:

$$DD = \frac{2.3}{3}$$

which is approximately 0.77.

The reference value GR with which the vector V is compared is obtained from the following equation:

$$GR = UX + DD \times SX \qquad (1)$$

where
UX represents a base value, and
SX represents a proportionality factor.

The preceding equation for the reference value GR indicates that, starting from the base value UX, the reference value GR increases linearly with increasing difference DD between the neutral densities of the region being investigated and the region of greatest transparency. The values of UX and SX are different for the various color segments of the color density diagram.

The following values for UX and SX have been found to be optimum for currently used film materials:

|  | UX | SX |
| --- | --- | --- |
| green segment | 0.07 | 0.1 |
| blue segment | 0.1 | 0.55 |
| yellow/red segment | 0.1 | 0.5 |
| purple segment | 1.0 | 3.0. |

Computation of the magnitude and orientation of the resultant color vector V by means of a computer of the type mentioned above is advantageously performed using the difference PBG between the blue and green densities of the region under investigation and the difference PRG between the red and green densities of this region. The density differences between corresponding colors of the region under investigation and the most highly transparent region may then be represented in the color density diagram of FIG. 3 by vector components FAXBG and FAXRG having the following magnitudes:

$$FAXBG = PBG - BMIN + GMIN \quad (2a)$$

$$FAXRG = PRG - RMIN + GMIN \quad (2b)$$

FAXBG and FAXRG thus represent the color characteristics or coloring of the region under investigation relative to the most transparent region. The magnitude RX of the color vector V, i.e. the distance from the origin of the color density diagram to the tip of the vector V, is given by the following equation:

$$RX = (FAXBG^2 + FAXRG^2 - FAXBG \times FAXRG)^{\frac{1}{2}}. \quad (3)$$

The orientation of the resultant color vector V in the color density diagram of FIG. 3 may be determined as follows:

| Values of FAXBG and FAXRG | Segment of color density diagram into which resultant vector V projects |
|---|---|
| FAXBG less than zero and FAXRG less than zero | green |
| FAXBG greater than zero and FAXBG - 2FAXRG greater than zero | blue |
| FAXBG less than zero and FAXRG greater than zero | yellow/red |
| FAXBG greater than zero and FAXBG - 2FAXRG less than zero | purple. |

Once the length and orientation of the resultant color vector V have been determined, the absolute value or magnitude of the resultant vector V is compared with a reference value which depends upon the color segment into which the resultant vector V projects and upon the neutral density of the region undergoing investigation.

In FIG. 3, the reference values for the various color segments of the color density diagram are represented by one or more concentric arcs each of which lies on a surface defining a frustum of a cone. Each of the arcs represents a reference value GR according to equation (1) and the arcs are identified by the corresponding values of DD representing the difference in neutral density between a region being investigated and the most transparent region. If a resultant vector V originating at the origin of the color density diagram extends up to or beyond the arc which represents the neutral density difference DD of the region corresponding to the resultant vector V, then the respective region is considered to contain a color dominant. This region is then assigned less weight than those regions of the same original 1a which are substantially free of color dominants in calculating the amounts of light in the three primary colors to which the original 1a is to be exposed during copying. As used herein, a phrase such as "less weight" includes assigning zero weight to the respective region, that is, disregarding this region altogether. By way of example, calculation of the amount of copying light for an original 1a in each primary color may involve summing the densities of the respective regions of the original 1a in each primary color in order to derive overall color densities for the original 1a which may be used for exposure control. The color densities of those regions of the original 1a having a color dominant may either be excluded from the summations altogether or may be assigned a lesser weight in the summations than the color densities of the regions which are substantially free of color dominants.

The exemplary resultant color vector V illustrated in FIG. 3 lies in the green segment of the color density diagram and has a length or magnitude of 0.35. From equation (1), the previously calculated value of 0.77 for the neutral density difference DD corresponding to the exemplary resultant vector V, and the table of values for UX and SX, the reference value GR with which the exemplary resultant vector V is to be compared has the following magnitude:

$$GR = 0.07 + 0.77 \times 0.1 = 0.07 + 0.077 = 0.147.$$

Accordingly, the magnitude of the exemplary resultant vector V exceeds the magnitude of the corresponding reference value GR and extends beyond the corresponding arc in FIG. 3. The exemplary resultant vector V is thus considered to represent a region having a green dominant.

All regions of an original 1a are investigated in the manner described above to determine the presence or absence of color dominants. The color densities of the regions which are substantially free of color dominants are then summed. The amounts of light in the primary colors to which the original 1a is to be exposed during copying are calculated in such a manner on the basis of the resulting sums that those regions of the original 1a which are substantially free of color dominants will have a neutral gray color composition in the copy. This has the effect that the regions of the original 1a which are highly color saturated or contain color dominants will be reproduced without a color shift, that is, will be correctly reproduced.

A greater degree of precision in the detection of color dominants and in exposure control may be achieved by using the dominant detection method of FIG. 3 in a two-stage exposure control procedure according to the West German Offenlegungsschrift No. 29 12 130. In this procedure, the neutral density of each region of an original 1a is determined as is the difference between the blue and green densities and the difference between the red and green densities of a respective region. This is done for all originals 1a of a film strip or at least for a sufficient number of originals 1a to be representative of the film strip. A pair of density difference curves is then derived. One curve represents the blue/green density difference as a function of neutral density while the other curve represents the red/green density difference as a function of neutral density. These density difference curves serve as an index for the photometric properties of the corresponding film strip. The blue/green density difference curve is developed by averaging the blue/green density differences of regions having the same neutral density. Similarly, the red/green density difference curve is developed by averaging the red/green density differences of regions having the same neutral density. These curves make it possible to calculate the amounts of copying light in the primary colors which enable normal reproduction of a region having a predetermined neutral density to be achieved.

In order to prevent falsifications due to dominants during the development of the color density difference curves, it is important to exclude density values from regions containing color dominants. To this end, a two-stage exposure control procedure according to the invention involves an initial evaluation of the regions of a film strip in the manner described with reference to FIG. 3. Each region of an original 1a is investigated as in FIG. 3 to determine whether or not a dominant is present. Only those regions which are determined to be substantially free of color dominants are used to develop the color density difference curves. In accordance with the teachings of the West German Offenlegungsschrift No. 29 12 130, the color density difference curves serve as a basis for calculating the contribution of the film per se to the densities used for exposure control. As a rule, the densities used for exposure control are based upon a contribution specific to the film per se and an equal contribution specific to the respective original 1a.

As indicated above, it is important to distinguish regions which contain color dominants from those which are substantially free of color dominants in the development of the density difference curves constituting the basis for the contribution of the film per se to exposure control. Similarly, a determination of the contribution to exposure control by an original 1a requires that regions which contain a color dominant be clearly distinguished from regions which are substantially free of color dominants. This is accomplished using the color density diagram illustrated in FIG. 4.

The color density diagram of FIG. 4 is similar to that of FIG. 3 and is divided into green, blue, yellow/red and purple segments in the same manner as the color density diagram of FIG. 3. However, in contrast to the color density diagram of FIG. 3, the origin of the color density diagram of FIG. 4 is not defined by the color densities of the most transparent region. Instead, the origin of the color density diagram of FIG. 4 is defined by the density differences of the density difference curves at the points of the curves lying at the neutral density of the region undergoing investigation.

In the color density diagram of FIG. 4, the color density differences for the region being investigated may be represented by a pair of vector components FAYBG and FAYRG having the following magnitudes:

$$FAYBG = PBG - FBG \quad (4a)$$

$$FAYRG = PRG - FRG. \quad (4b)$$

As before, PBG represents the actual difference between the blue and green densities of the region under investigation while PRG represents the actual difference between the red and green densities of this region. On the other hand, FBG represents the difference between the blue and green densities of the region under investigation as determined from the blue/green density difference curve at the neutral density of the region. Likewise, FRG represents the difference between the red and green densities of the region being investigated as determined from the red/green density difference curve at the neutral density of this region.

FAYBG and FAYRG represent the color characteristics or coloring of the region being investigated. The resultant vector of the vector components FAYBG and FAYRG has a length or magnitude RY which is given by the following equation:

$$RY = (FAYBG^2 + FAYRG^2 - FAYBG \times FAYRG)^{\frac{1}{2}}. \quad (5)$$

The resultant color vector of FIG. 4 extends into one of the color segments green, blue, yellow/red and purple. The criteria for establishing the orientation of the color vector of FIG. 4 are precisely the same as those employed with reference to FIG. 3.

In order to determine whether a color dominant is present in the region under investigation, the magnitude or length of the resultant color vector of FIG. 4 is compared with a reference or boundary value. The reference or boundary value again depends upon the color segment of the color density diagram of FIG. 4 into which the resultant vector projects and upon the neutral density of the region under investigation. In particular, the reference or boundary value, which is here denoted by GRY, is equal to a base value UY plus a proportionality factor multiplied by the difference DD between the neutral density of the region being investigated and the neutral density of the most transparent region. Thus, the reference or boundary value GRY is calculated in accordance with the following equation:

$$GRY = UY + 1/0.5(OY - UY) \times DD. \quad (6)$$

Equation (6) applies only for neutral density differences DD up to about 0.5. When the neutral density difference for a region under investigation exceeds 0.5, the reference or boundary value GRY is equal to OY.

The values of UY and OY are different in the various color segments of FIG. 4 and may be determined from the following table:

|  | UY | OY |
|---|---|---|
| green segment | 0.03 | 0.15 |
| yellow/red segment | 0.03 | 0.35 |
| purple segment | 0.03 | 0.25 |
| blue segment | 0.2 | 0.2. |

In the color density diagram of FIG. 4, a determination of whether or not a region of an original 1a contains a color dominant is performed in the same manner as for the color density diagram of FIG. 3. Below a neutral density difference DD of about 0.5, the portions of the color segments of FIG. 4 which indicate the absence of a dominant when the resultant color vector terminates therein have a frustoconical configuration. Above a neutral density difference DD of about 0.5, the portions of the color segments of FIG. 4 which indicate the absence of a color dominant have a circular cylindrical shape. This means that the reference or boundary value GRY undergoes no further increase when the neutral density difference DD exceeds 0.5.

Each of the regions of an original 1a is again investigated for the presence of a dominant in accordance with FIG. 4. The density values in each of the primary colors for those regions which are free of color dominants are then added. From the resulting area integrals of the color densities, a value is calculated in each primary color representing the contribution of the original 1a to exposure control. These values are combined with similar values for the contribution of the film per se to exposure control thereby yielding a density value in each primary color which may be used to regulate the amount of copying light in the respective color.

The density values for exposure control are processed in accordance with the teachings of the West German Offenlegungsschrift No. 29 12 130 to generate factors for the amounts of copying light in the respective primary colors. These factors are calculated in such a manner that the regions of the original 1a containing color dominants have little or no weight in determining the amounts of light to which the original 1a is exposed during copying.

The method of the invention for detecting regions of an original 1a containing color dominants employs density-dependent, as well as color-dependent, reference or boundary values which serve to distinguish regions containing color dominants from those which are free of color dominants. This method is not limited to the use of the most transparent region as a reference but, for a given type of film, may be based upon a predetermined value specific to this type of film. The predetermined value may be determined, for example, on the basis of a large number of originals of the given type of film or on the basis of a calibrating original for such film. It is further possible to simply use the known mask density for a particular type of film as the basic value for the method of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of determining the amount of light in each primary color for copying a colored original, said method comprising the steps of:
    (a) measuring the transparency in each primary color of a photosensitive article containing at least one colored original, the measuring step being performed at a plurality of first regions located in said one original, and a plurality of second regions located in a border of said one original;
    (b) analyzing the measurements obtained during the measuring step to identify at least one region having a transparency which equals or exceeds the transparencies of the remaining regions;
    (c) evaluating said first regions to detect color dominants, the evaluating step for each first region including processing the respective measurements to derive a characteristic value representing at least one color characteristic of the first region relative to the corresponding color characteristic of said one region, and the evaluating step for each first region further including comparing the respective characteristic value with a reference value which is a function of the density of said one region to thereby establish the probable presence or absence of a color dominant in the first region; and
    (d) calculating the amount of light in each primary color for copying said one original, the calculating step being based on the measurements obtained from said first regions, and the calculating step being performed giving less weight to the first regions which probably contain a color dominant than to the first regions which are probably substantially free of color dominants.

2. The method of claim 1, wherein the calculating step is performed disregarding the first regions which probably contain a color dominant.

3. The method of claim 1, wherein the analyzing step comprises calculating the neutral density of each region, said one region having a neutral density which is equal to or less than the neutral densities of said remaining regions.

4. The method of claim 3, wherein the neutral density of each region is calculated as the arithmetic average of the blue, green and red densities thereof.

5. The method of claim 1, comprising the steps of processing the measurements from the first regions which are probably substantially free of color dominants to generate first and second curves of density difference versus neutral density, said first curve representing first density differences between a first pair of primary colors, and said second curve representing second density differences between a second pair of primary colors; and reevaluating at least some of said first regions for detection of color dominants, the reevaluating step for each first region including calculating the actual first and second density differences for the first region, relating each actual density difference to a point of the corresponding curve lying at the neutral density of the first region to derive a second value representing at least one color characteristic of the first region, and comparing said second value with a boundary value to thereby confirm the presence or absence of a color dominant in the first region.

6. The method of claim 5, wherein said first curve is generated by averaging the first density differences of first regions having substantially identical neutral densities and said second curve is generated by averaging the second density differences of first regions having substantially identical neutral densities.

7. The method of claim 5, wherein each of said boundary values is a function of the neutral density of the respective first region.

8. The method of claim 5, wherein said boundary values are color-dependent.

9. The method of claim 5, wherein said boundary values are color-dependent and each of said boundary values is also a function of the neutral density of the respective selected region.

10. The method of claim 5, wherein said second values are derived by subtraction of each actual density difference and the density difference defined by the corresponding curve at the respective neutral density.

11. A method of determining the amount of light in each primary color for copying a colored original, said method comprising the steps of:
    (a) measuring a property in each primary color of a photosensitive article containing at least one colored original, the measuring step being performed at a multiplicity of regions located in a portion of said article which includes said one original;
    (b) analyzing the measurements obtained during the measuring step to identify at least one region having a transparency which equals or exceeds the transparencies of the remaining regions, the analyzing step including calculating the neutral density of each region, and said one region having a neutral density which is equal to or less than the neutral densities of said remaining regions, the analyzing step further including eliminating all regions having a neutral density greater than about 0.9 from consideration as said one region;

(c) evaluating selected regions constituting part of said one original to detect color dominants, the evaluating step for each selected region including processing the respective measurements to derive a characteristic value representing at least one color characteristic of the selected region relative to the corresponding color characteristic of said one region, and the evaluating step for each selected region further including comparing the respective characteristic value with a reference value to thereby establish the probable presence or absence of a color dominant in the selected region; and (d) calculating the amount of light in each primary color for copying said one original, the light calculating step being based on the measurements obtained from said selected regions, and the light calculating step being performed giving less weight to the selected regions which probably contain a color dominant than to the selected regions which are probably substantially free of color dominants.

12. The method of claim 11, wherein the analyzing step comprises eliminating all regions having a blue density less than about 0.7 from consideration as said one region.

13. The method of claim 11, wherein the analyzing step comprises eliminating all regions in which the blue density minus the red density is less than about 0.15 from consideration as said one region.

14. The method of claim 11, wherein the analyzing step comprises eliminating all regions having a blue density less than about 0.7, and in which the blue density minus the red density is less than about 0.15, from consideration as said one region.

15. A method of determining the amount of light in each primary color for copying a colored original, said method comprising the steps of:

(a) measuring a property in each primary color of a photosensitive article containing at least one colored original, the measuring step being performed at a multiplicity of regions located in a portion of said article which includes said one original;

(b) analyzing the measurements obtained during the measuring step to identify at least one region having a transparency which equals or exceeds the transparencies of the remaining regions;

(c) evaluating selected regions constituting part of said one original to detect color dominants, the evaluating step for each selected region including processing the respective measurements to derive a characteristic value representing at least one color characteristic of the selected region relative to the corresponding color characteristic of said one region, and the evaluating step for each selected region further including comparing the respective characteristic value with a reference value to thereby establish the probable presence or absence of a color dominant in the selected region, each of said reference values being a function of the neutral density of the respective selected region; and (d) calculating the amount of light in each primary color for copying said one original, the calculating step being based on the measurements obtained from said selected regions, and the calculating step being performed giving less weight to the selected regions which probably contain a color dominant than to the selected regions which are probably substantially free of color dominants.

16. The method of claim 15, wherein the magnitudes of said reference values increase with increasing neutral density.

17. The method of claim 15, wherein each of said reference values equals a base value plus the difference between the neutral densities of said one region and a respective selected region multiplied by a proportionality factor.

18. The method of claim 17, wherein said base value is color-dependent.

19. The method of claim 17, wherein said proportionality factor is color-dependent.

20. The method of claim 17, wherein both said base value and said proportionality factor are color-dependent.

21. The method of claim 20, wherein the evaluating step comprises establishing a color density diagram having an origin, and six color axes radiating from said origin, said origin being defined by the blue, green and red densities of said one region, and said axes including equally spaced blue, green and red axes, and equally spaced yellow, purple and cyan axes which respectively constitute extensions of said blue, green and red axes, said diagram being divided into a green area bounded by said yellow and cyan axes, a blue area bounded by said cyan axis and a line bisecting the angle between said blue and purple axes, a purple area bounded by said line and said red axis, and a yellow/red area bounded by said red and yellow axes, and the evaluating step further comprising assigning each of said selected regions to one of said areas, said base value and proportionality factor having the following magnitudes:

|  | base value | proportionality factor |
| --- | --- | --- |
| green area | 0.07 | 0.1 |
| blue area | 0.1 | 0.55 |
| purple area | 0.1 | 3.0 |
| yellow/red area | 0.1 | 0.5 |

22. A method of determining the amount of light in each primary color for copying a colored original, said method comprising the steps of:

(a) measuring a property in each primary color of a photosensitive article containing at least one colored original, the measuring step being performed at a multiplicity of regions located in a portion of said article which includes said one original;

(b) analyzing the measurements obtained during the measuring step to identify at least one region having a transparency which equals or exceeds the transparencies of the remaining regions;

(c) evaluating selected regions constituting part of said one original to detect color dominants, the evaluating step for each selected region including processing the respective measurements to derive a characteristic value representing at least one color characteristic of the selected region relative to the corresponding color characteristic of said one region, and the evaluating step further including establishing a color density diagram having an origin, and six color axes radiating from said origin, said origin being defined by the blue, green and red densities of said one region, and said axes including equally spaced blue, green and red axes, and equally spaced yellow, purple and cyan axes which respectively constitute extensions of said blue, green and red axes, the processing for each selected region comprising deriving the density differences between the selected region and said one region in respective primary colors, and plotting said differences in said diagram, and the evaluating step for each selected region also including comparing the respective characteristic value with a reference value to thereby establish the probable presence or absence of a color dominant in the selected region; and (d) calculating the amount of light in each primary color for copying said one original, the calculating step being based on the measurements obtained from said selected regions, and the calculating step being performed giving less weight to the selected regions which probably contain a color dominant than to the selected regions which are probably substantially free of color dominants.

23. The method of claim 22, wherein the evaluating step for each selected region comprises vectorially adding the respective density differences in said diagram to obtain a resultant vector having a length which represents the characteristic value of the selected region.

24. The method of claim 23, wherein each of said reference values is a function of the direction of the respective resultant vector.

25. The method of claim 23, wherein each of said reference values is a function of the neutral density of the respective selected region.

26. The method of claim 23, wherein each of said reference values is a function of the direction of the respective resultant vector and a function of the neutral density of the respective selected region.

27. A method of determining the amount of light in each primary color for copying a colored original, said method comprising the steps of:

(a) measuring a property in each primary color of a photosensitive article containing at least one colored original, the measuring step being performed at a multiplicity of regions located in a portion of said article which includes said one original;

(b) analyzing the measurements obtained during the measuring step to identify at least one region having a transparency which equals or exceeds the transparencies of the remaining regions;

(c) evaluating selected regions constituting part of said one original to detect color dominants, the evaluating step for each selected region including processing the respective measurements to derive a characteristic value representing at least one color characteristic of the selected region relative to the corresponding color characteristic of said one region, and the evaluating step for each selected region further including comparing the respective characteristic value with a reference value to thereby establish the probable presence or absence of a color dominant in the selected region;

(d) processing the measurements from the selected regions which are probably substantially free of color dominants to generate first and second curves of density difference versus neutral density, said first curve representing first density differences between a first pair of primary colors, and said second curve representing second density differences between a second pair of primary colors;

(e) reevaluating at least some of said selected regions for detection of color dominants, the reevaluating step for each selected region including calculating the actual first and second density differences for the selected region, relating each actual density difference to a point of the corresponding curve lying at the neutral density of the selected region to derive a second value representing at least one color characteristic of the selected region, and comparing said second value with a boundary value to thereby confirm the presence or absence of a color dominant in the selected region, each of said boundary values equalling a base value plus the neutral density of the respective selected region multiplied by a proportionality factor when the neutral density is less than a predetermined value; and (f) calculating the amount of light in each primary color for copying said one original, the light calculating step being based on the measurements obtained from said selected regions, and the light calculating step being performed giving less weight to the selected regions which probably contain a color dominant than to the selected regions which are probably substantially free of color dominants.

28. The method of claim 27, wherein said boundary values are constants for neutral densities exceeding said predetermined value.

29. The method of claim 27, wherein the reevaluating step for each region comprises establishing a color density diagram having an origin, and six color axes radiating from said origin, the origin being defined by the density differences of said curves at the neutral density of the region undergoing reevaluation, and the axes including equally spaced blue, green and red axes, and equally spaced yellow, purple and cyan axes which respectively constitute extensions of said blue, green and red axes, each diagram being divided into a green area bounded by the yellow and cyan axes, a blue area bounded by the cyan axis and a line bisecting the angle between the blue and purple axes, a purple area bounded by the bisecting line and the red axis, and a yellow/red area bounded by the red and yellow axes, and the reevaluating step further comprising assigning the respective region to one of the areas, said proportionality factor being equal to $1/0.5 \, (OY-UY)$ where UY is said base value and OY and UY have the following magnitudes:

|  | UY | OY |
| --- | --- | --- |
| green area | 0.03 | 0.15 |
| blue area | 0.2 | 0.2 |
| purple area | 0.03 | 0.25 |
| yellow/red area | 0.03 | 0.35. |

30. The method of claim 27, wherein said boundary values equal OY when the neutral density exceeds said predetermined value.

31. The method of claim 30, wherein said predetermined value is approximately 0.5.

* * * * *